United States Patent Office 3,839,438
Patented Oct. 1, 1974

3,839,438
DERIVATIVES OF THIA-BISALDEHYDES
Katsumi Hayashi, Mentor, Ohio, assignor to The Lubrizol Corporation, Wickliffe, Ohio
No Drawing. Continuation-in-part of application Ser. No. 868,617, Oct. 22, 1969. This application Oct. 2, 1970, Ser. No. 77,759
Int. Cl. C07c 59/04
U.S. Cl. 260—535 R    3 Claims

ABSTRACT OF THE DISCLOSURE

Derivatives of thia-bisaldehydes are formed by reacting a thia-bisaldehyde with another reagent such as alcohol, organometallic compound, or metal base. They are useful for industrial purposes such as the preparation of polyurethanes.

---

This application is a continuation-in-part of copending application Ser. No. 868,617 filed Oct. 22, 1969, now abandoned.

This invention relates to novel compositions of matter and to methods of preparing the same. More particularly the invention relates to derivatives of thia-bisaldehydes having Formula I below:

I.
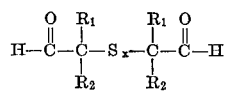

$$H-\overset{O}{\overset{\|}{C}}-\overset{R_1}{\underset{R_2}{C}}-S_x-\overset{R_1}{\underset{R_2}{C}}-\overset{O}{\overset{\|}{C}}-H$$

wherein $x$ is at least one and $R_1$ and $R_2$ are each hydrogen or the same or different hydrocarbon or substituted hydrocarbon radicals. The derivatives contemplated herein are characterized by the presence of at least one thia-bisalkylene structural grouping of Formula II below:

II.
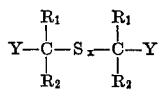

$$Y-\overset{R_1}{\underset{R_2}{C}}-S_x-\overset{R_1}{\underset{R_2}{C}}-Y$$

wherein $x$, $R_1$ and $R_2$ are as described previously and are further characterized in that at least one of the terminal groups, i.e., the Y groups, is an ester or alcohol group with the proviso that when both Y groups are ester groups the derivative is a cyclic ester. Where two or more thia-bisalkylene groupings are present, they are in most instances joined through ester linkages or ether linkages and the compound will contain at least two terminal Y groups which may be lactone, carboxylic acid, halide, anhydride, metal salt, amine or ammonium salt, amide, imide, or imine groups, or may likewise be ester or alcohol groups.

The thia-bisaldehydes provide the skeleton of the thia-bisalkylene group which characterizes the compounds of the present invention. Thus in one embodiment of the invention, a thia-bisaldehyde may be converted to such a compound through the contemporaneous conversion of both aldehyde groups to terminal Y groups by a chemical reagent. In such conversion, the thia-radical and the $R_1$ and $R_2$ radicals are inert and remain unchanged. As indicated previously, $x$ is at least one and may be as high as six or eight, preferably from two to six. Each of $R_1$ and $R_2$ may be hydrogen, hydrocarbon or substituted hydrocarbon radicals.

The term "hydrocarbon radical" as used herein includes aliphatic, cycloaliphatic and aromatic (including aliphatic- and cycloaliphatic-substituted aromatic and aromatic-substituted aliphatic and cycloaliphatic) radicals. It also includes cyclic radicals wherein the ring is completed through another portion of the molecule; that is, any two indicated substituents may together form a cycloalkyl radical.

Illustrative of hydrocarbon radicals within the scope of this invention are the following: methyl, phenyl, ethyl, cyclohexyl, naphthyl, propyl, cyclopentyl, butyl, cyclopentadienyl, phenanthryl, hexyl, cyclooctyl, anthryl, octyl, cyclohexadienyl, decyl, vinyl, allyl, dodecyl, oleyl, stearyl, triacontanyl, hentriacontanyl, polyisobutenyl (molecular weight 1600), cyclohexylphenyl, benzyl, cyclooctynaphthyl, naphthylbutyl, phenyloctyl, phenylstearyl, cyclopentylphenyl, dicyclopentylphenyl, naphthylpolybutenyl (molecular weight 700), dicyclohexylnaphthyl, cyclooctylanthryl, diphenylpolybutenyl (molecular weight 900), phenycyclophentyl, tolyl, diphenylcyclohexy, xylyl, naphthylcyclooctyl, diethylphenyl, diphenylcyclocyclooctyl, octylphenyl, anthrylcyclooctyl, stearylnaphthyl, dioleylphenyl, polyisobutenyl (molecular weight 900) phenyl, polypropenyl (molecular weight 1500), octadecenyl, propenylphenyl, dimethylcyclohexyl, methylcyclopentyl, octylcyclopentyl, octadecylcyclohexyl, triacontanylcyclooctyl, and polybutenyl (molecular weight 800) cyclohexyl.

Where a named radical has several isomeric forms (e.g., butyl), all such forms are included.

Many obvious variations of these radicals will be apparent to those skilled in the art and are included within the scope of the invention.

Substituted hydrocarbon, alkyl, aryl, etc., radicals are considered fully equivalent to the hydrocarbon, alkyl, aryl, etc., radicals and to be part of this invention. By "substituted" is meant radicals containing substituents which do not alter significantly the character or reactivity of the radical. Illustrative examples are: halide (fluoride, chloride, bromide, iodide), hydroxy, ether (especially lower alkoxy), ester (especially lower carbalkoxy), amido, nitro, and cyano. In general, no more than about three, and more usually no more than two such substituent groups will be present for each 10 carbon atoms in the radical. Especially preferred are radicals containing no more than 1 substituent group for each 7 carbon atoms.

Preferably, the hydrocarbon or substituted hydrocarbon radicals in the compounds of this invention are free from ethylenic and acetylenic unsaturation and have no more than about 30 carbon atoms, desirably no more than about 12 carbon atoms. A particularly preference is expressed for lower hydrocarbon radicals, the word "lower" denoting radicals containing up to seven carbon atoms. Still more preferably, they are lower alkyl or hydrocarbyl-aryl radicals, most often alkyl.

In preferred embodiments, the compounds of this invention include the following:

A. Hydroxy-Acids

Hydroxy-acid derivatives of thia-bisaldehydes have Formula III below:

III.
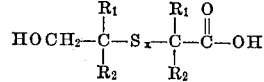

$$HOCH_2-\overset{R_1}{\underset{R_2}{C}}-S_x-\overset{R_1}{\underset{R_2}{C}}-\overset{O}{\overset{\|}{C}}-OH$$

wherein $R_1$, $R_2$ and $x$ are as previously defined. Examples of such compounds include 6-hydroxy-2,2,5,5-tetramethyl-3,4-dithiahexanoic acid (i.e., conforming to Formula III above wherein $R_1$ and $R_2$ are each methyl and $x$ is two); 6-hydroxy-2,5-diethyl-2,5-dibutyl-3,4-dithiahexanoic acid; 6-hydroxy-2,2,5,5-tetraethyl-3,4-dithiahexanoic acid; etc.

The hydroxy-acids are obtainable most conveniently by treating the corresponding thia-bisaldehyde with an alkaline reagent such as an alkali metal hydroxide or alkaline earth metal hydroxide, preferably a dilute aqueous solution thereof (e.g., 5–50% weight of the hydroxide in water). Such alkaline reagents may be sodium hydroxide, potassium hydroxide, lithium hydroxide, barium hydroxide, calcium hydroxide and strontium hydroxide.

B. Monomeric Ester, Halides, Amines, Salts, Amides, Imides, and Other Derivatives of Hydroxy-Acids By virtue of the presence of the hydroxy group and the carboxylic group in the hydroxy-acids described by Formula III above, various monomeric compounds can be easily obtained by the conversion of such hydroxy group and/or the carboxylic group to other polar groups normally derivable therefrom. Examples of such monomeric compounds include esters formed by esterification of either or both of the hydroxy group and the carboxylic group; metal salts, ammonium or amine salts, amides, imides, and acyl halides formed through the carboxylic group; and lactones formed through intramolecular cyclization of the hydroxy-acid accompanied with the elimination of water. Where appropriate the aforesaid compounds may contain in the polar moieties hydrocarbon or substituted hydrocarbon radicals within the meaning of the terms "hydrocarbon" and "substituted hydrocarbon" as previously defined. Specific examples of such monomeric compounds are 6-chloro-2,2,5,5-tetramethyl-3,4-dithiahexanoic acid, 6-acetoxy-2,2,5,5-tetramethyl-3,4-dithiahexanoic acid, ethyl 6-hydroxy-2,2,5,5-tetraethyl-3,4-dithiahexanoate, phenyl 6-hydroxy-2,2,5,5-tetraethyl-3,4-dithiahexanoate, N-methyl 6-hydroxy-2,2,5,5-tetramethyl - 3,4-dithiahexamide, 6-dimethylamino-2,2,5,5-tetraethyl-3,4-dithiahexanoic acid, 6-hydroxy-2,2,5,5-tetrapropyl-3,4-dithiahexamide, the lactone of 6-hydroxy-2,2,5,5-tetramethyl-3,4-dithiahexanoic acid, etc. Such compounds are readily formed by methods generally known for the conversion of the hydroxy group and/or the carboxy group of the hydroxy acids to the appropriate derivative groups.

C. Condensation Polyesters

Condensation polymers having at least two thia-bis-alkylene structural groups of Formula II above are contemplated within the present invention. Such polymers include condensation polymers formed by the reaction of thia-bisaldehydes of Formula I above with a polyhydric alcohol, particularly a glycol. Such condensation polyesters include those having terminal hydroxy groups and containing repeating units of thia-bisalkylene structure such as the following:

IV. 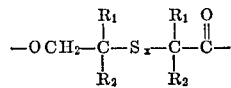

V. 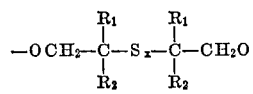

VI. 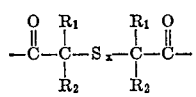

VII. 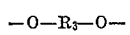

wherein $R_1$, $R_2$ and $x$ are as previously defined and $R_3$ is a divalent hydrocarbon radical or substituted divalent hydrocarbon radical within the meaning of the terms "hydrocarbon" and "substituted hydrocarbon" as previously defined; such units are joined by ester groups.

The polyesters of this invention include those which may be prepared by reacting a thiadialdehyde of the formula

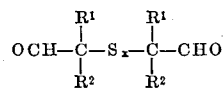

with a glycol of the formula HO—$R^3$—OH, in the presence of a metal alkoxide. Dialdehydes with the above formula may be prepared by reacting an aldehyde of the formula

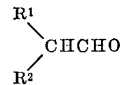

with a sulfur halide, as described, for example, in U.S. Pats. 2,580,695 and 3,296,137. The preferred aldehydes for conversion to thiadialdehydes are those in which $R^1$ and $R^2$ are lower alkyl radicals; examples of these are isobutyraldehyde, α-methylbutyraldehyde, α-ethylbutyraldehyde, α-ethylcaproaldehyde, α-(n-propyl) caproaldehyde and the like. Thiadialdehydes in which $x$ is 2 (disulfides) are preferred.

Suitable glycols include ethylene glycol, diethylene glycol, 1,4-butanediol, 1,6-hexanediol, p-xylylenediol, 1,4-cyclohexanediol and the like. Preferred are lower alkylene glycols such as ethylene glycol, 1,3-propanediol and 1,4-butanediol.

Metal alkoxide may be provided by any of several known methods, such as reaction of an alcohol (preferably the glycol used in the reaction) with an active metal (usually an alkali metal) or with an organometallic compound such as butyllithium or ethylmagnesium chloride or bromide.

The reaction is generally carried out in an inert solvent such as naphtha, benzene, toluene, diethylene glycol dimethyl ether, diphenyl ether or the like. Temperatures below about 125° C. are suitable, and about 40–80° C. is preferred.

The molecular weight of the polyester is dependent on the molar ratio of dialdehyde to glycol. Higher molecular weight products are obtained as this ratio is increased. Preferably, the ratio is at least 5:1. On the other hand, the amount of alkoxide in the reaction mixture has little or no effect on the molecular weight of the product. As little as 0.001 equivalent of alkoxide per equivalent of dialdehyde may be used.

While the invention is not restricted to any particular theory or reaction mechanism, it is believed that the preparation involves a Tishchenko reaction during which the aldehyde groups undergo mutual oxidation and reduction to alcohol and carboxylic acid groups. Since the reaction is probably random as to which aldehyde groups are oxidized and which are reduced, the intermediate will ordinarily contain three molecular species derived from the dialdehyde: a diol, a diacid and a hydroxy acid. Obviously, the number of alcohol radicals in such molecules will equal the number of acid radicals. A condensation then takes place between the acid and alcohol radicals to form the polyester. Since the glycol HO—$R^3$—OH is also present in the mixture, hydroxy radicals are present in excess and the product contains predominantly hydroxy-terminated molecules.

This proposed reaction theory explains the fact that product molecular weight is independent of alkoxide concentration. According to this theory, alkoxide is not consumed in the Tishchenko reaction but glycol is consumed in polyester formation. Regardless of wether the glycol is consumed directly or by conversion to alkoxide which subsequently reacts, the overall result is that alkoxide concentration is maintained.

The structures of all the molecular species of the products of the above-described process are not known with certainty, but it is fairly certain that the product consists predominately of hydroxy-terminated polyesters containing the repeating units of Formular IV, V, VI and VII hereinabove. For example, the reaction of 2,2,5,5-tetramethyl-3,4-dithiahexanedial with 1,4 - butanediol in the presence of the lithium alkoxide of the diol yields products having the structural groupings

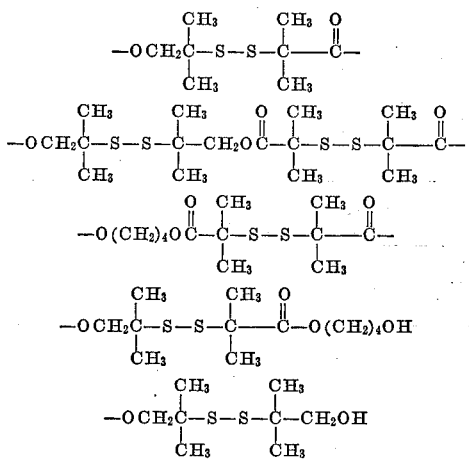

plus others whose structures will be apparent. It may also yield small percentages of products containing ether linkages and/or terminal carboxy groups; the presence of the latter is evidenced by the fact that the product sometimes has a small acid number (usually about 2–5). Because of the uncertainty as regards the exact structure of all species present in the polyesters of this invention, they may be completely described only in terms of the method for their preparation.

D. Cyclic Derivatives

Relatively high molecular weight cyclic polymers derived from the thia-bisaldehydes of Formula I above include 28-membered ring polyesters of the following structural formulas VIII and IX:

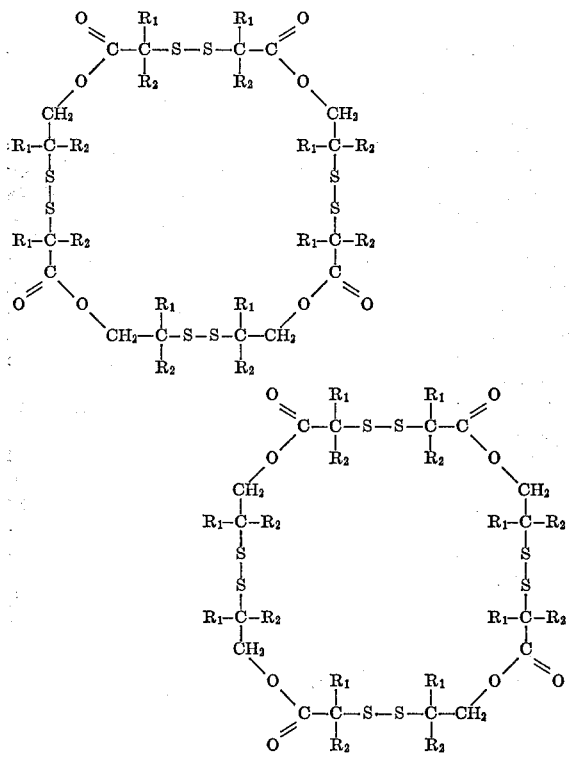

wherein $R_1$ and $R_2$ are as previously defined. Such 28-membered ring esters are obtained by reacting a dithia-bisaldehyde of Formula I above with particular alcohols such as tert-butanol under specific conditions or contacting a dithia-disaldehyde with a catalytic amount of alkali metal hydrides or alkali metal alkyls, such as sodium hydride in a solvent such as pyridine. Similarly, other cyclic polyesters are derived from monothia-bisaldehyde, trithia-bisaldehyde or other polythia-bisaldehyde (e.g., having four or more thia groups).

E. Homopolymers

Homopolymers are derived from thia-bisaldehydes by treatment thereof with a metal alkyl, particularly alkali metal alkyls or aluminum alkyls such as butyllithium, tributylaluminum, diisopropylaluminum chloride, etc., a metal alkoxide such as aluminum isopropoxide, sodium ethoxide, etc. or metal hydrides such as sodium hydride or lithium aluminum hydride. The homopolymers are characterized by the presence of two or more of the following thiabisalkylene structural groupings IV. (supra)

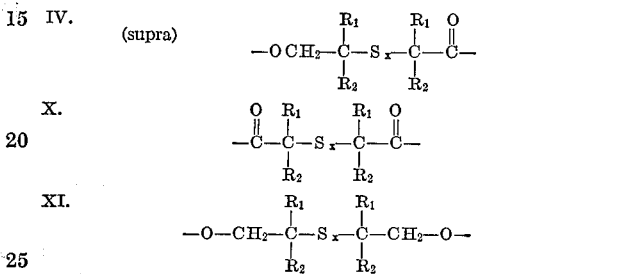

wherein $R_1$, $R_2$ and $x$ are as defined previously. The formation of such polymers may be viewed as involving the intermediate steps of the reduction of at least one aldehyde group of a thia-bisaldehyde molecule to an alcohol group and the oxidation of at least one aldehyde group of the same or different thia-aldehyde molecule to a carboxy group and of the subsequent esterification of the newly formed alcohol and carboxy groups.

The following examples illustrate the compounds of this invention and the processes by which they are formed.

EXAMPLE 1

Preparation of Thia-bisaldehydes 2,2,5,5 - Tetramethyl-3,4-dithia-hexanedial (i.e., 2,2'-dithia-bis(2-methylpropionaldehyde) is prepared by mixing sulfur monochloride (1 mole) and isobutyroaldehyde (2 moles) at 50–55° C. while nitrogen is bubbled through the mixture. The product is purified by distillation and crystallization from mineral spirits solvent. The purified thia-bisaldehyde has a boiling point of 81–83° C./0.02 torr, a melting point of 24.3° C. and a sulfur content of 31.3%.

EXAMPLE 2

Homopolymers of Thia-bisaldehydes

The dithia-bisaldehyde of Example 1 (1 mole) in benzene (300 cc.) is treated with a catalytic amount (1 ml.) of a solution of n-butyl lithium (1.6 moles) in hexane (1 liter). An exothermic reaction takes place and the reaction mixture is maintained at 55–60° C. for 3 hours and 20 minutes and then mixed with methanol to precipitate a homopolymer. After purification and drying, the polymer has a sulfur content of 31.2% and a reduced specific viscosity of 0.29 (as measured at a concentration of 0.5 gram per 100 ml. of chloroform as the solvent at 30° C.). The reduced specific viscosity (abbreviated as RSV) is the value obtained in accordance with the formula $$RSV = \frac{\text{Relative Viscosity} - 1}{\text{Concentration}}$$

wherein the relative viscosity is determined by measuring, by means of a viscometer, the viscosity of a solution of the polymer in a solvent (at a specific concentration) and the viscosity of the solvent, both at 30° C. For purpose of computation by the above formula the concentration is adjusted to a particular value (e.g., 0.5 gram of the polymer per 100 ml. of solvent). A more detailed discussion of the reduced specific viscosity, sometimes referred to as the specific viscosity, as well as its relationship to the average molecular weight of the polymer, appears in Flory, *Principles of Polymer Chemistry* (1953 Edition, page 308 et seq.).

EXAMPLE 3

Preparation of Esters of Hydroxy Acids

To a mixture of 1000 ml. of methanol and 2 grams of sodium, there is added 206 grams (1 mole) of the thiabisaldehyde of Example 1 at 50–52° C. The mixture is kept at room temperature until the reaction is complete. The product isolated from the reaction mixture is methyl 6-hydroxy - 2,2,5,5 - tetramethyl-3,4-dithiahexanoate and, after purification, is found to have a boiling point of 82–83° C./0.05 torr.

EXAMPLE 4

Preparation of Cyclic Esters

To a mixture of 1.15 grams of sodium hydride and 400 ml. of pyridine there is added 206 grams (1 mole) of the thiabisaldehyde of Example 1. An exothermic reaction occurs and the reaction temperature reaches 95° C. After reaction is complete, the mixture, which solidifies upon cooling, is purified by washing with acetone. The product isolated from the mixture has a melting point of 179–180° C., a sulfur content of 31.2%, and a molecular weight of 812; the product is a 28-membered ring ester.

EXAMPLE 5

Preparation of Hydroxy Acids

To 1200 grams (3 moles) of 10% aqueous sodium hydroxide there is added 412 grams (2 moles) of the thiabisaldehyde of Example 1 at room temperature. An exothermic reaction occurs and the reaction temperature reaches 65° C. The mixture is stirred for 2 hours and the product isolated from such mixture (by acidification with hydrochloric acid and precipitation) is 6-hydroxy-2,2,5,5-tetramethyl-3,4-dithiahexanoic acid, which after purification has a melting point of 89–89.5° C.

EXAMPLE 6

Preparation of Lactones

A mixture of 224 grams (1 mole) of the hydroxy acid of Example 5 and 153 grams (1.5 moles) of acetic anhydride is heated under reflux for 4 hours. Thereafter the volatile materials in the reaction mixture are allowed to evaporate and the residue is distilled. The distillate is the lactone of 6-hydroxy-2,2,5,5-tetramethyl-3,4-dithiahexanoic acid which, after purification has a melting point of 55–56° C. and a sulfur content of 31.1%.

EXAMPLE 7

Preparation of Amides

The lactone of Example 6 is treated with aqueous ammonia. The product of such treatment is 6-hydroxy-2,2,5,5-tetramethyl-3,4-dithiahexanamide having a melting point of 85–86° C. and a sulfur content of 29.4%.

EXAMPLE 8

To a solution of 4.5 grams (0.05 mole) of 1,4-butanediol in 200 ml. of benzene, maintained under nitrogen, is added 31.3 ml. (0.05 mole) of a 1.62 N solution of butyllithium in n-hexane. The mixture is stirred for 20 minutes and then heated to 50° C., and 103 grams (0.5 mole) of 2,2,5,5-tetramethyl-3,4-dithiahexanediol is added. An exothermic reaction begins, and the reaction vessel is cooled to maintain the temperature below 70° C. Stirring of the mixture is continued for two hours after the exotherm has ceased.

The solution is poured into 1.5 liters of textile spirits and allowed to stand overnight. The supernatant liquid is then decanted, the oily product is dissolved in benzene and washed with water and dilute hydrochloric acid and dried over magnesium sulfate. Upon evaporation of the solvent under reduced pressure, 84.9 grams (78.7% of the theoretical yield) of the desired polyester is obtained. It has a hydroxyl equivalent of 1084.

EXAMPLES 9–12

The procedure of Example 8 is repeated, using various proportions of the three reactants. The treatment with textile spirits is omitted. Information on reactant ratios and products is given in Table I.

TABLE I

| Example | Dialdehyde | Moles diol | Butyl-lithium | Product yield (percent) | Hydroxyl equivalent |
|---|---|---|---|---|---|
| 9 | 1.0 | 0.01 | 0.02 | 85 | 1,097 |
| 10 | 0.5 | 0.05 | 0.005 | 89 | 1,085 |
| 11 | 1.05 | 0.21 | 0.04 | 89 | 604 |
| 12 | 2.0 | 0.10 | 0.056 | 83 | 2,850 |

EXAMPLE 13

Following the procedure of Examples 9–12, a polyester is prepared from 234 grams (1 mole) of 2,2,5,5-tetraethyl-3,4-dithiahexanedial, 9 grams (0.1 mole) of 1,4-butanediol and 30 ml. (0.048 mole) of 1.6 N butyllithium in 400 ml. of benzene. The product yield is 215 grams (88.5% of theoretical), and the hydroxy equivalent of the product is 1260.

EXAMPLE 14

Following the procedure of Examples 9–12, a polyester is prepared from 1 mole of 2,5-dimethyl-2,5-diphenyl-3,4-dithiahexanediol, 0.1 mole of diethylene glycol and 0.5 mole of butyllithium.

EXAMPLE 15

2,2,6,6-Tetramethyl-3,4,5-trithiaheptanediol is obtained as a by-product from the reaction of isobutyraldehyde with sulfur monochloride. Following the procedure of Examples 9–12, one mole of this dialdehyde is reacted with 0.1 mole of 1,6-hexanediol and 0.1 mole of butyllithium. A polyester similar to that of Examples 9–12 is obtained.

The compositions of the present invention are useful for a variety of purposes. For example the hydroxy acids are useful as chemical intermediates for the preparation of paints, rubber vulcanization accelerators, etc. In applications requiring photosensitivity the homopolymers, for example, derived from the lactone of 6-hydroxy-2,2,5,5-tetramethyl-3,4-dithiahexanoic acid are especially useful. Images can be produced by exposing to ultraviolet light suitably masked coatings of said homopolymer on substrates (e.g., glass) having a binding layer of polyvinyl alcohol. The exposed homopolymeric-coated substrate is immersed in methanol with the results that an image of the mask is formed.

The condensation polyesters having terminal hydroxy groups are particularly useful in reaction with isocyanates to form polyurethanes. The polyurethanes thus formed are useful in the preparation of coating compositions, adhesives, foams, etc. Among the isocyanates which may be reacted with the condensation polyesters are, for example, toluene diisocyanate, diphenylmethane diisocyanate, naphthalene diisocyanate and the like. In general, compounds of the formula OCN—R—NCO may be used, wherein R is a divalent hydrocarbon radical, preferably an aromatic or alkylaromatic radical. The polyurethanes thus prepared have repeating units of the formula.

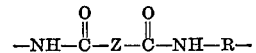

wherein Z is derived from the polyesters of this invention by abstraction of hydrogen from the hydroxy radicals thereof. In cases where the polyurethane contains isocyanate groups, it may be extended with water, glycols, hydrazine and the like. When so extended, it may also contain urea, alkylene-bis-carbamo, N,N' - bis - carbamohydrazide or similar moieties.

The preparation of polyurethanes from the polyesters of this invention is illustrated by the following examples.

EXAMPLE 16

A solution of 21.4 grams of the product of Example 8, 1.76 grams of toluene diisocyanate, a few drops of triethylamine and one drop of dibutyltin dioleate in dimethylacetamide is heated with stirring under nitrogen at 60° C. for six hours. The mixture is then poured into an excess of methanol and the viscous oil which precipitates is washed with methanol and dried in a vacuum oven. The product is a light brown elastomeric polyurethane.

EXAMPLE 17

A mixture of 30.3 grams of the product of Example 8, 5.6 grams of diphenylmethane diisocyanate and 40 ml. of N,N-dimethylacetamide is stirred at 75° C. under nitrogen for 24 hours. Then 0.75 gram of a 4% solution of water in N,N-dimethylacetamide is added over a 4-hour period. The resulting polyurethane solution is poured into 500 ml. of methanol and the product which precipitates is washed with methanol, dissolved in chloroform and reprecipitated by pouring into methanol. After a final washing, it is dried at 70° C. under reduced pressure.

EXAMPLE 18

A mixture of 47.2 grams of the product of Example 10 and 11.1 grams of diphenylmethane diisocyanate is heated at 70° C. with stirring for 3 hours. N,N-Dimethylacetamide, 50 ml., is then added, followed by 0.39 gram of water in a 4% N,N-dimethylacetamide solution. Carbon dioxide is evolved as the water is added, and the viscosity of the solution increases rapidly. The mixture is stirred for an additional hour and poured into 600 ml. of methanol. The polymeric precipitate is washed with methanol and dried in vacuum.

EXAMPLE 19

Following the procedure of Example 18, an extended polyurethane is prepared from 43 grams of the product of Example 11, 17.5 grams of diphenylmethane diisocyanate, 0.63 gram of water and 25 ml. of N,N-dimethylacetamide.

What is claimed is:

1. A compound having the structural formula

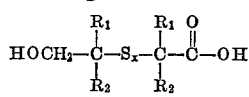

wherein $x$ is one or two; each of $R_1$ and $R_2$ is hydrogen or a lower alkyl; both $R_1$ are identical, and both $R_2$ are identical.

2. A compound according to claim 1 wherein each of $R_1$ and $R_2$ is a lower alkyl radical and $x$ is 2.

3. A compound according to claim 2 wherein each of $R_1$ and $R_2$ is methyl.

References Cited

UNITED STATES PATENTS 3,182,081  5/1965  Goldberg et al. _____ 260—535

FOREIGN PATENTS 567,752  6/1958  Belgium _____ 260—535 R

LORRAINE A. WEINBERGER, Primary Examiner

P. J. KILLOS, Assistant Examiner

U.S. Cl. X.R.

260—67 S, 75 S, 75 TN, 327 R, 327 P, 479 S, 481 R, 488 F, 514 J, 516, 534 S, 561 S, 598, 599, 601 R